Oct. 20, 1964

H. W. SCHOLIN 3,153,466

PRECISION LOCKING DEVICES

Filed Sept. 20, 1962

INVENTOR:—
HAROLD W. SCHOLIN
BY:—
Marzall, Johnston, Cook & Root
ATTYS.

Oct. 20, 1964 H. W. SCHOLIN 3,153,466
PRECISION LOCKING DEVICES
Filed Sept. 20, 1962 2 Sheets-Sheet 2

INVENTOR:—
HAROLD W. SCHOLIN
BY: Marzall Johnston,
Cook & Root.
ATTYS.

United States Patent Office 3,153,466
Patented Oct. 20, 1964

3,153,466
PRECISION LOCKING DEVICES
Harold W. Scholin, 7900 W. Belmont Ave., Chicago, Ill.
Filed Sept. 20, 1962, Ser. No. 224,959
8 Claims. (Cl. 188—69)

This invention relates, in general, to releasable latching of parts in a predetermined, precise, relative position, and has more particular reference to improved, releasable latching or locking mechanism to hold machine parts accurately in predetermined relationship.

There is shown in U.S. Patent No. 2,826,099, granted to Harold W. Scholin and Carl W. Scholin on March 11, 1958, and in U.S. Patent No. 2,915,921, granted to the same patentees on December 8, 1959, turntable indexing mechanisms especially useful, in connection with the operation of machine tools, for the purpose of supporting and relatively shifting a work piece, or a succession of work pieces, with respect to a tool or tools, or for shifting a tool or tools with respect to a work piece or pieces, through a series of accurately located work stations or positions.

An important object of this invention is to provide latching or locking mechanisms for use in connection with indexing mechanisms of the character of those in the aforesaid patents; a further object being to provide latching or locking mechanisms useful in the latching or locking of a turntable of an indexing mechanism accurately in desired relative angular positions at the conclusion of each indexing movement of the turntable; a still further object being to provide improved latching or locking mechanism which releases the turntable at the commencement of the turning of the table and relatches said turntable in the desired, oriented position at the end of each rotation step of said turntable.

Another important object is to provide a latching or locking mechanism for releasably locking a member in a fixed position of desired orientation; a further object being to provide a latching or locking mechanism with a rotatable locking head adapted to receive and then hold a pin or projection on a part moved to a desired, oriented position and to release said pin or projection when said part is to be moved again; a still further object being to provide a latching or locking mechanism in which a rotatable locking head with an opening coaxial with the axis of rotation is adapted to receive in one position of rotation of said locking head a pin or projection of a movable part and to lock said pin or projection in said opening when said head is rotated; a still further object being to provide improvements in the shapes of coacting walls of said opening and said pins or projections whereby said part is accurately positioned when its pin or projection is locked in said recess; and a still further object being to provide locking mechanisms for releasably locking a linearly movable member in a predetermined position.

The foregoing and numerous other important objects, advantages, and inherent functions of the invention will become apparent as the same is more fully understood from the following description, which, taken in connection with the accompanying drawings, discloses preferred embodiments of the invention.

Referring to the drawings.

Figure 5:
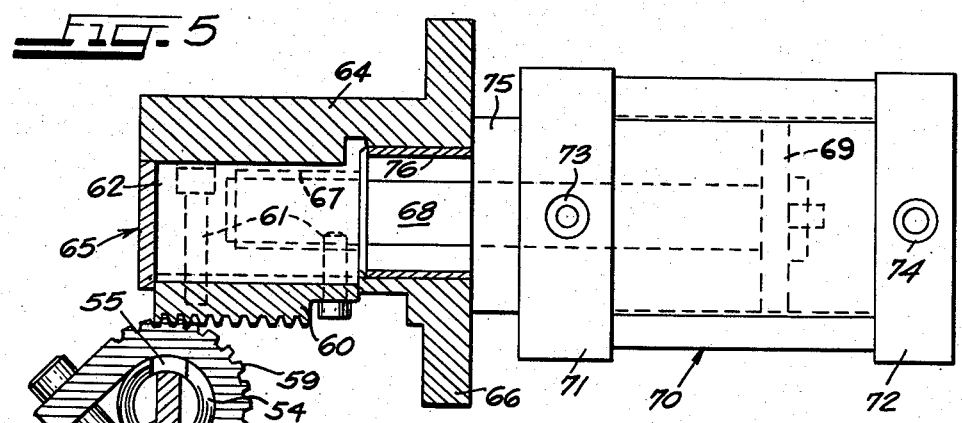
Figure 6:
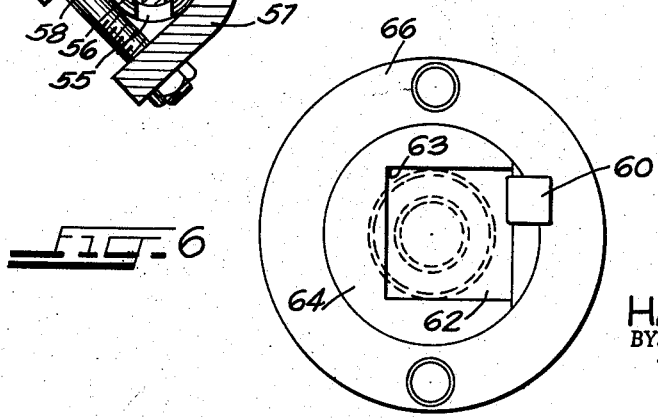

FIG' 4 is a sectional view of a locking device of the invention used to releasably hold a reciprocable slide;

FIG. 5 is a top plan view partly in section, of a mechanism for rotating the locking head of the locking devices of the invention between locked and unlocked positions; and FIG. 6 is a front elevation of the mechanism for rotating the locking head.

Figure 1:
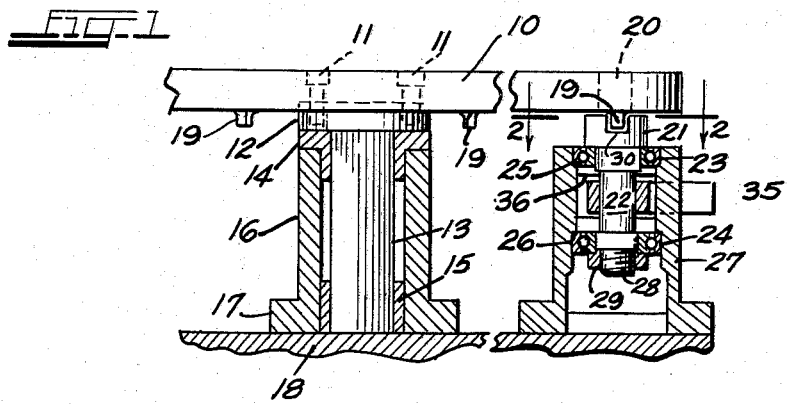
FIG. 1 is a sectional view, partly broken away, of a turntable and locking mechanism therefor.
Figure 2:
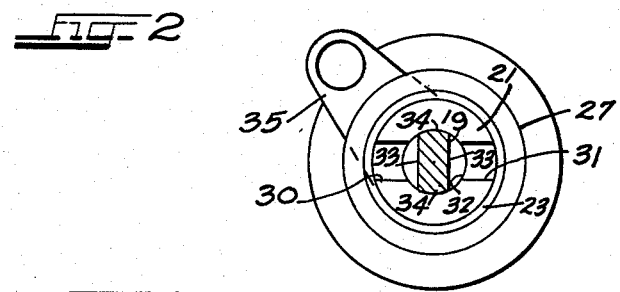
FIG. 2 is a sectional view on section 2—2 of FIG. 1, showing the locking mechanism in top plan view.

To illustrate the invention, the drawings show in FIGS. 1 and 2 a rotatable turntable 10, shown only in fragment in FIG. 1. The turntable 10 may be attached by bolts 11 to the disc-shaped head 12 of the turntable shaft 13. The turntable shaft 13 is rotatably journalled in an upper bushing 14 and a lower bushing 15 which may be mounted in the hub 16. The base 17 of the hub 16 is fixedly mounted on a plate or base for the turntable mechanism. The mechanism for rotating the turntable may be any suitable manually-operated or power-operated mechanism or the turntable may be rotated by hand, if desired.

Projecting from the underside of turntable 10 are a plurality of locking pins 19, the cylindrical bases 20 of which are tightly fitted in cylindrical holes in the turntable 10 at predetermined intervals. The locking pins 19 are spaced equidistant from the axis of rotation of the turntable 10 so that each locking pin may enter the rotary locking head 21 of a locking device of the invention.

The rotary locking head 21 preferably is mounted in a prestressed bearing assembly providing a minimum of play for the rotary locking head 21 and its shaft 22. The prestressed bearing assembly may comprise an upper ball bearing 23 and a lower ball bearing 24. The inner race of each ball bearing is tightly fitted on the shaft 22, while the outer race of the ball bearing 23 is drawn tightly against the annular shoulder 25 of the hollow housing 27 and the outer race of the ball bearing 24 is drawn tightly against the annular shoulder 26 of said housing. The bearing assembly may then be prestressed by drawing the nut 29 on the lower, threaded end 28 tightly against the inner race of the ball bearing 24, thus drawing the lower face of the rotary head 21 tightly against the inner race of ball bearing 23.

The rotary locking head 21 may have a pair of diametrically opposed, aligned slots 30, 31 in the upper portion thereof. These slots are of a width and depth of sufficient magnitude to allow the pins 19 to pass through the slots when the rotary locking head 21 is properly aligned for such passage, i.e., when the slots 30, 31 are in the orbital path of pins 19. The inner ends of the slots 30, 31 open into the upper side of a round hole 32 having a depth at least sufficient so that its bottom is below the lower edge of the locking pins 19. The hole 32 is coaxial with the axis of rotation of the locking head 21.

The locking pins 19 may have opposite flat sides 33 which are substantially perpendicular to the radius line to the center of the locking pin from the axis of rotation of the turntable 10. The other two sides of the locking pins 19 may be rounded ends 34, having a radius of curvature very slightly under the diameter of the hole 32. The round ends 34 coact with the wall of hole 32 to hold tightly the locking pin in the locking head when one is rotated relative to the other to the locked position.

When the rotary head 21 is in the unlocked position shown in FIG. 1, a locking pin 19 may enter or leave the locking head. When the pin 19 is centered with relation to the hole 32 in the locking head, the locking head 21 may be rotated to the locked position shown in FIG. 2. In this position, the round ends 34 of the pin 19 are seated against the round wall of the hole 32. The turntable is then held in a precise, fixed position. When the turntable is to be again rotated, the locking head 21 is rotated to the unlocked position shown in FIG. 1 to allow the pin 19 to move out of the locking head 21.

The turntable-locking device combination of FIGS. 1 and 2 can be used in many machine applications. In one of its simpler forms, the locking head 21 may be rotated manually by swinging a crank arm 35 fixedly mounted on a shaft 22 of locking head 21. A horizontal slot 36 is provided in the cylindrical wall of the housing 27, through which slot the crank arm 35 projects. The slot has sufficient length to allow the swinging movement of crank arm 35 between locked and unlocked positions and the ends of the slot 36 may be employed as abutments defining the extremes of rotation and movement of the head 21.

It is also contemplated by the invention that the crank arm 35 can be connected to a link arm through which the locking head may be rotated manually or may be rotated by a mechanism operating in timed sequence with a drive for rotating the turntable step-by-step over an angular distance of rotation corresponding to the spacing of the pins 19. For example, such mechanism could be employed in indexing mechanisms of the character of the aforesaid patents.

It will be appreciated that the machine fit between the walls of the hole 32 and the round ends 34 of the locking pins 19 must be a close fit where close precision is required in the positioning of the turntable at each stage of rotation. Thus, close tolerances between the wall of the hole 32 and the ends 34 of pins 19, coupled with precise positioning of the pins 19 in the turntable 10 and the prestressed bearing assembly for supporting the locking head 21, will provide precise positions in which the turntable is locked in its step-by-step movement.

Figure 3:
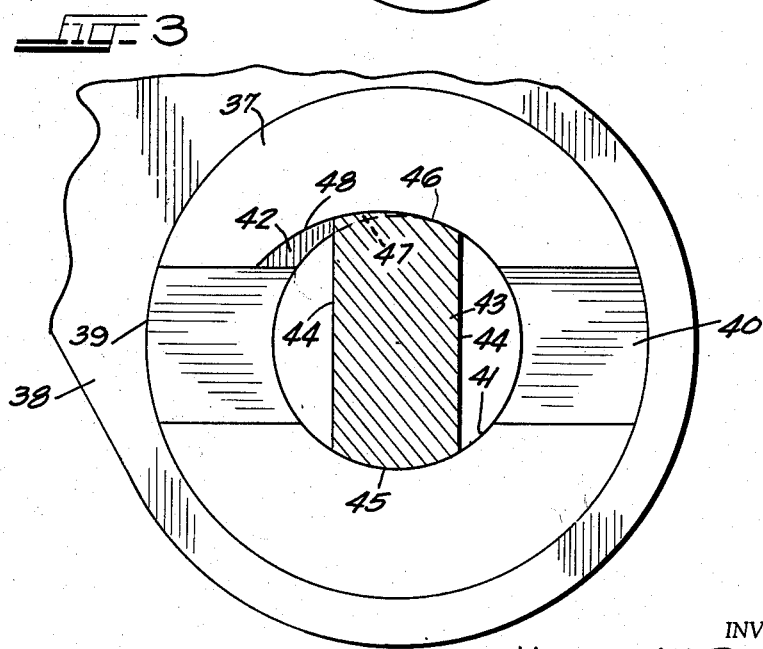
FIG. 3 is an enlarged, top plan view of a modified form of a locking head for locking mechanisms of the invention.

The embodiment of locking head structure and locking pin structure shown in FIG. 3 will provide an excellent precision fit between the rotary locking head and the locking pin. In this embodiment, rotary locking head 37 may be rotatably mounted on a prestressed bearing assembly of the character heretofore described. Any suitable means may be provided for rotating the locking head 37 between locked and unlocked positions, e.g., a crank arm 38 of like character to the crank arm 35. The crank arm 38 is shown only in fragment in FIG. 3.

The rotary locking head 37 has a pair of diametrically opposed, aligned, slots 39, 40 in the upper portion thereof of a width and depth sufficient to allow the locking pin to pass therethrough when the locking head is in the unlocked position. The latter position is one in which the locking head is rotated 90° clockwise from the position illustrated in FIG. 3. In this embodiment, the locking head has a round hole 41, the sides of which are intercepted by the slots 39, 40. The entire wall of the hole 41, however, is not cylindrical but rather has an eccentric, sloping segment 42 intercepting the wall of the slot 39.

The locking pin 43 may have opposed, flat side 44, a round end 45, and an eccentric end 46 in which the eccentric portion 47 slopes in mating fit with the eccentric wall 42 of the locking head.

As seen in FIG. 3, the sloping, eccentric wall 42 has an upper edge 48 which departs from the circle defined by the hole 41 whereby the upper edge assumes a curvature of progressively increasing radius with relation to the center of the circle defined by the hole 41, e.g., the arc of a cycloid. The bottom edge of the sloping wall 42 may be the radius of the circle defined by the hole 41, or it also may be eccentric. The eccentric portion 47 of the end wall 46 of the locking pin 43 has an eccentricity corresponding to the eccentricity of the wall 42 with which the end wall 46 is in contact when the parts are in locked position.

This structure is advantageously employed in situations requiring extreme precision. The eccentric wall 42 and the eccentric portion 47 of the end wall 46 provide a wedging action whereby the head 37 may be rotated until it is tightly wedged with the locking pin 43. Furthermore, this structure is self-compensating because it will adjust to wear which occurs in repeated locking and unlocking operations. If desired, the end wall 45 of the pin 43 and the portion of the wall of the hole 41 mating therewith may be provided with similar eccentric walls as the wall 42 and the eccentric portion 47 of the end wall 46.

Figure 4:
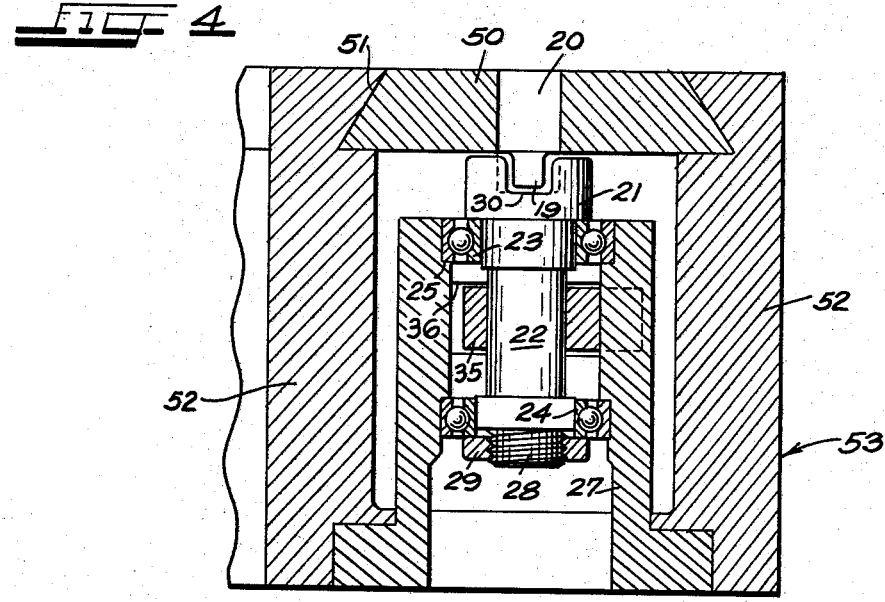

The embodiment of FIG. 4 shows the adaptation of the locking devices of the invention in locking a reciprocable slide in one or more fixed positions. In this embodiment, the locking head and its supporting structure are identical with the locking head of FIGS. 1 and 2. Accordingly, like numerals have been used to designate like parts.

In FIG. 4, the reciprocable slide 50 has a sliding, dovetail fit 51 in the side walls 52 of a fixed base or support 53. The slide is movable relative to the base 53 in a direction transverse to the plane on which the section was taken in FIG. 4. The rotary head 21 is fixedly mounted so that the locking pin or pins 19 are centered with respect to the axis of rotation of the locking head 21. The locking head 21 and the pins 19 coact to lock the slide 50 in a predetermined fixed position in the same manner as heretofore described for the operation of the turntable of FIG. 1.

The embodiment of FIGS. 5 and 6 shows a mechanism for rotating the locking head of the invention between locked and unlocked positions. This mechanism can be employed, for example, in indexing mechanisms of the character described in the aforesaid U.S. Patents 2,826,099 and 2,915,921 wherein the locking headlocking pin structures of the invention are substituted for the locking devices employed in the indexing mechanisms of the aforesaid patents.

In the embodiment of FIGS. 5 and 6, the rotary locking head 54 has a structure corresponding to the locking head heretofore described. The locking pin 56 is permitted to enter and depart from the locking head 54 via the diametrically-opposed slots 55. The mechanism is shown in FIG. 5 in the unlocked position.

The head 54 may be rotated between the locked and unlocked positions by fixedly attaching a U-bar 57 to the locking head 54 below the lower sides of the slots 55. The U-bar 57 is clamped tightly on the locking head 54 by means of a bolt 58 extending through the ends of the legs of the U-bar 57.

The arcuate, outer edge of the U-bar 57 has gear teeth 59 which mesh with the gear teeth of the rack 60. The rack 60 is mounted for reciprocal movement, which in turn rotates the U-bar 57 and the locking head 54 on which the U-bar is mounted.

The rack 60 is attached by bolts 61 to a sliding block 62 slidably mounted in a rectangular, axial passage 63 in the segment 64 of bearing 65. The segment 64 is a cylindrical segment having a flat side in which is cut the rectangular axial passage 63. The bearing 65 has a flange 66 which may have bolt holes for mounting the bearing on a machine.

Slide block 62 has a tapped hole 67 positioned in the slide block 62 so that the axis of the tapped hole corresponds to the axis of the cylindrical segment 64. The end of a piston rod 68 is threaded in the tapped hole 67 and carries at its opposite end a piston 69. The piston 69 is slidably mounted in the piston chamber 70 of a hydraulic or pneumatic piston drive. The piston chamber 70 communicates with cylindrical chambers 71, 72, each having a coupling 73, 74 adapted to be connected to pneumatic or hydraulic pressure lines. The cylindrical chamber 71 has mounted thereon a coupling member 75 which has a tubular segment 76 threadedly or otherwise tightly fitted in a hole in the end of the bearing 65.

Thus, when air or hydraulic fluid is supplied to the chamber 72, the piston 69 will be driven to the left as viewed in FIG. 5. The rack 60 causes the U-bar 57 and locking head 54 to rotate to a locking position. When air or hydraulic fluid is admitted to the chamber 71, the piston moves in the opposite direction and causes the locking head to rotate to the unlocked position shown in FIG.

5. This pneumatic or hydraulic drive can be readily used in adapting the locking head-locking pin structures of the invention is indexing mechanisms and the like. For example, with indexing mechanisms employing a pneumatic drive to rotate the turntable, e.g., the indexing mechanisms of the aforesaid patents, the pneumatic system can be coupled to the pneumatic drive of FIGS. 5 and 6 for rotating the locking head at the desired interval during the step-by-step turning of the indexing turntable. There are many types of machines in which the locking mechanisms of the invention can be used. The foregoing descriptions of exemplary applications of these mechanisms in machines is far from exhaustive of the areas in which these locking mechanisms may be employed.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A locking device comprising a locking head having an axial hole extending thereinto from an axial end of said head, said head having aligned slots in said axial end thereof, said slots intercepting said hole on opposite sides of the latter and extending radially through said end of said head from said hole to the respective, opposite, radially outer sides of said head, a locking pin, means for effecting relative rotation about the axis of said head between said locking head and locking pin between locking and unlocking positions, means for moving said locking pin laterally through said slots into or out of said hole when said head and pin are relatively positioned in unlocked orientation, and means on said locking pin coacting with the wall of said hole for holding said locking when they are in the locked position.

2. A locking device comprising a rotatable locking head having an axial round hole therein, radial, opposed slots in an axial end of said head, said slots intercepting said hole on opposite sides of the latter and extending radially through said axial end of said head from said hole to the respective, opposite, radially outer sides of said head, a locking pin, said pin having opposite side walls spaced apart a distance less than the width of said slots, said pin also having curved, opposite end walls spaced apart a distance greater than the width of said slots, each with a curvature of a radius slightly less than the radius of said hole, and means for rotating said locking head relative to said pin between a locked position wherein said curved end walls are in locking engagement with the wall of said hole and an unlocked position wherein said pin may pass through said slots.

3. A locking device comprising a rotatable locking head having an axial round hole therein, radial, opposed slots in the end of said head, said slots intercepting said hole, a locking pin, said pin having opposite side walls spaced apart a distance less than the width of said slots, said pin also having curved, opposite end walls spaced apart a distance greater than the width of said slots, an eccentric surface on a portion of the wall of said hole, said end walls having a curvature providing a mating fit with the wall of said hole, one of said end walls also having a matching eccentric surface, said surfaces forming a wedging fit in the locked position of said head and pin, and means for rotating said locking head relative to said pin between a locked position wherein said curved end walls are in locking engagement with the wall of said hole and an unlocked position wherein said pin may pass through said slots.

4. A locking device as claimed in claim 3 wherein said eccentric surface on said portion of said wall of said hole is a sloping surface intercepting a side wall of one of said slots.

5. A turntable structure comprising a rotatable turntable, locking means for holding said turntable in at least one predetermined angular position of the rotation cycle of said turntable, said locking means comprising a pin fixedly mounted on said turntable, a rigidly mounted, but rotatable locking head having a hole therein, said head having aligned slots in the wall thereof, said slots intercepting said hole on opposite sides of the latter, said pin being positioned on said turntable to move through said slots in the course of rotation of said turntable when said slots are positioned in the orbital path of said pin, and means on said locking pin coacting with the wall of said hole for holding said locking pin in said hole when the locking head is rotated to the locked position.

6. A slide structure comprising a base, a slide member slidable on said base, locking means for holding said slide against sliding movement relative to said base, said locking means comprising a pin fixedly mounted on said slide member, a rigidly mounted, but rotatable locking head having a hole therein, said head having aligned slots in the wall thereof, said slots intercepting said hole on opposite sides of the latter, said pin being positioned on said slide member to move through said slots in the course of sliding movement of said slide member on said base when said slots are aligned in the path of movement of said pin, and means on said locking pin coacting with the wall of said hole for holding said locking pin in said hole when the locking head is rotated to the locked position.

7. A locking device as claimed in claim 2 wherein said means for rotating said locking means comprises gear means operatively connected to said locking means, a reciprocable rack having teeth meshing with said gear means, and power drive means for reciprocating said rack.

8. A locking device as claimed in claim 7 wherein said power drive means is a pneumatic cylinder having a piston operatively connected to said rack.

References Cited in the file of this patent

UNITED STATES PATENTS 1,309,197    Heins _____ July 8, 1919